US009521267B2

United States Patent
Noldus

(10) Patent No.: US 9,521,267 B2
(45) Date of Patent: Dec. 13, 2016

(54) METHOD, NETWORK NODE AND APPLICATION SERVICE FOR MAKING AVAILABLE CALL DETAIL RECORDS IN AN IP MULTIMEDIA SUBSYSTEM TYPE NETWORK

(75) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

(21) Appl. No.: 14/114,336

(22) PCT Filed: Apr. 29, 2011

(86) PCT No.: PCT/EP2011/056872
§ 371 (c)(1),
(2), (4) Date: Jan. 8, 2014

(87) PCT Pub. No.: WO2012/146309
PCT Pub. Date: Nov. 1, 2012

(65) Prior Publication Data
US 2014/0211787 A1    Jul. 31, 2014

(51) Int. Cl.
*H04M 15/00* (2006.01)
*H04L 29/06* (2006.01)
(52) U.S. Cl.
CPC .......... *H04M 15/56* (2013.01); *H04L 65/1006* (2013.01); *H04L 65/1083* (2013.01)
(58) Field of Classification Search
CPC .. H04L 65/1083; H04L 65/1006; H04M 15/56
(Continued)

(56) References Cited

U.S. PATENT DOCUMENTS

| 9,036,620 | B2 * | 5/2015 | Procopio | H04M 7/123 370/352 |
| 2009/0196268 | A1 * | 8/2009 | Caldwell | H04L 12/14 370/338 |
| 2010/0257079 | A1 * | 10/2010 | Haiyan | 705/34 |

FOREIGN PATENT DOCUMENTS

EP    2254320 A1 *  11/2010

OTHER PUBLICATIONS

Unknown, Author. "Digital Cellular Telecommunications System (Phase 2+); Universal Mobile Telecommunications System (UMTS); LTE; Telecommunication Management; Charging Management; IP Multimedia Subsystem (IMS) Charging." ETSI TS 132 260 V. 10.3.0. Apr. 2011.

* cited by examiner

*Primary Examiner* — Luat Phung
*Assistant Examiner* — Thomas R Cairns
(74) *Attorney, Agent, or Firm* — Murphy, Bilak & Homiller, PLLC

(57) ABSTRACT

The present invention relates to a method of operating a network node (e.g. an MGCF) in a telecommunications network system during a call, wherein the call has been established through a packet switched and a circuit switched part of the network. The method comprises a step of the network node receiving an indication of the call being terminated. The network node also receives call detail data from a switching network node in the circuit switched part of the network, and includes the received call detail data in a call termination message for making the call detail data available in the packet switched part of the network. Then, the network node transmits the termination message to a call controlling SIP-AS in the packet switched part of the network. The present invention further relates to methods of (Continued)

operating a call controlling SIP-AS and an extended services SIP-AS.

19 Claims, 8 Drawing Sheets

METHOD, NETWORK NODE AND APPLICATION SERVICE FOR MAKING AVAILABLE CALL DETAIL RECORDS IN AN IP MULTIMEDIA SUBSYSTEM TYPE NETWORK

TECHNICAL FIELD

The present invention is directed to a method of operating a network node in a telecommunications network system during a call or at call establishment, wherein said call has been established through a packet switched part and a circuit switched part of said telecommunications network system, wherein said network node comprises a media gateway control function.

The present invention further relates to a method of operating a call controlling session initiation protocol type application server and a method of operating an extended services session initiation protocol type application server. In addition, the present invention relates to a network node for a circuit switched part of a telecommunication network system, to a call controlling session initiation protocol type application server and to an extended services session initiation protocol type application server.

BACKGROUND

In the IP multimedia subsystem (IMS) type network, subscribers may have multiple terminals for making use of such network. In particular, these may include session initiation protocol (SIP) based terminals and global system for mobile communication (GSM) based terminals, or terminals that include both SIP signaling capability and GSM signaling capability and that may receive services from the GSM network and from the IMS network at the same time.

In the IP multimedia subsystem type networks, various solutions exist for providing extended services even to users in a GSM based network (or another circuit switched type telecommunications network). An example of such a solution is the BCS Mobility solution provided by Ericsson.

When a call is established by a subscriber using such extended services with his or her GSM terminal, there will be several charging records generated in the telecommunications system. The circuit switched part of the telecommunications network system operates based on call detail records that are generated by the mobile services switching centre (MSC) that serves the calling or called terminal. In the packet switched part of the telecommunications network system, such as in the IP multimedia subsystem (IMS) network, a session initiation protocol type application server which is responsible for handling the call between the parties engaged in the call, generates IMS charging records to be used for charging the services provided to the user. Charging of these calls will be done in the IMS network, based on the charging records generated by the SIP application server (SIP-AS).

In order to enable correct charging of the call in the IMS network, the charging record(s) from the IMS network generated by the SIP-AS need(s) to be correlated with the call detail records from the circuit switched part of the telecommunication network system. This is performed by a post processing system in the IMS network, which determines based on the charging record generated by the SIP-AS whether all data is available for charging the call, or correlation is required to correlate the charging record with one or more call detail records (CDR's) from the circuit switched part of the telecommunications network system.

The charging method of the prior art, as described for example above, contains a cumbersome and difficult step of correlating call detail data (being call related data from e.g. call detail records) from the circuit switched part of a telecommunications network system with charging records generated by the IMS network.

SUMMARY

It is an object of the present invention to obviate at least some of the above mentioned disadvantage of the prior art, and to optimize charging of calls to or from subscribers that are using both circuit switched parts and packet switched parts of a telecommunications network system.

This and other objects are achieved by the present invention in that there is provided a method of operating a network node in a telecommunications network system during a call, wherein the call has been established through a packet switched part and a circuit switched part of the telecommunications network system. This network node comprises a media gateway control function. The method of the invention comprises a step of the network node receiving an indication of the call being terminated. Further, the network node transmits a call termination message to a call controlling session initiation protocol type application server in the packet switched part of the telecommunications network system. Prior to transmitting the termination message as mentioned above, the network node receives call detail data from a switching network node in the circuit switched part of the telecommunications network system. In a preferred embodiment of the invention, the network node and the switching node are co-located. The switching node can, in such case, transfer the call detail data that it had collected during the call, to the network node by means of internal signalling message exchange. The network node, prior to the transmission of the termination message, includes the received call detail data in the termination message, for making the call detail data available in the packet switched part for enabling call charging in the packet switched part of the telecommunications network system.

Since the media gateway control function (MGCF) includes the call detail data into the call termination message transmitted to the session initiation protocol type application server (SIP-AS), the requirements for later correlation of this call detail data from the circuit switched network with a charging record of the IP multimedia subsystem in a post processing system may be obviated, because the call detail data is now available in the IP multimedia subsystem. The availability of the call detail data in the IP multimedia subsystem (IMS) enables the SIP-AS that handles the call in the IMS network to send the charging data from both the packet switched part and the circuit switched part of the network in one charging record to the post processing system for charging purposes. This provides a clear benefit to the telecommunications provider since the complex and cumbersome correlation process in the post processing system can be dispensed with for this call. IT is noted that the abovementioned call termination message may, for example, have the form of a call termination indication message or a call termination acknowledgement message.

Herein below, some elements of specific embodiments of the inventions will be briefly described. It is to be noted that these elements are optional to the invention and the basic concept is formed by what is stated above.

In a specific embodiment of the present invention, the method further comprises a step of the network node receiving instructions from an extended services session initiation protocol type application server (extended services SIP-AS) in the packet switched part of the telecommunications network system. These instructions are received prior to the network node including the received call detail data in the termination message. The instructions from the extended services session initiation protocol type application server indicate to the network node that for this call, the received call detail data (or call detail data to be received upon termination of the call), is to be included in the call termination message. The benefit of this is that it enables easy implementation of the method of the present invention in an existing telecommunication environment for a specific telecommunications provider. If the telecommunications provider uses an extended services SIP-AS for providing extended services to its subscribers (or intends to implement such a SIP-AS), the specifics of this charging method and the subscribers for which it is to be implemented may beneficially be set by the telecommunications service provider that controls the extended services SIP-AS. Note that, although throughout the description the wording instructions may be used, the skilled person will appreciate that these instructions could be in the form of a single instruction or a set of instructions at the choice of the skilled person implementing the invention.

According to a further specific embodiment of the present invention, the method further comprises a step of the network node receiving instructions from the call controlling session initiation protocol type application server in the packet switched part of the telecommunications network system. Such instructions are received by the network node prior to receiving the call detail data to be included in the call termination message. Again, such instructions indicate to the network node that the call detail data is to be included in the call termination message to be sent to the SIP-AS that performs the call controlling in the packet switched part of the telecommunications network system. The benefit of this specific embodiment is that the network provider of the network infrastructure may easily implement this system for all the subscribers that make use of this network infrastructure (i.e. all the subscribers of all the telecommunications services providers that use the network infrastructure of the network provider).

According to a further specific embodiment of the present invention, the network node for receiving the call detail data, receives at least one element of a group including a mobile originating call detail record (MOC CDR), a mobile terminating call detail record (MTC CDR), a roaming call forwarding call detail record (RCF CDR) and a composite call detail record including at least one further call detail record in addition to said mobile originating call detail record, said mobile terminating call detail record or said roaming call forwarding call detail record.

This specific embodiment enables to apply the method of the present invention to both calls originating in a circuit switched part of the telecommunications network system and calls terminating in the circuit switched part of the telecommunications network system.

According to a further specific embodiment of the present invention, the call termination message is a session initiation protocol type application server message (a SIP message, such as a SIP request message or a SIP response message). The call detail data is included as a SIP body component of the call termination message. This specific embodiment of the present invention enables easy implementation in the present SIP protocol used for IMS networks. In particular it is noted that the information from the call detail data may be included in the SIP message as a text block containing tagged data lines. Such a text block will be ignored by network entities that are using the SIP message but are not aware of the specific method of the present invention.

The above mentioned specific elements of the embodiments of the present invention are optional for the invention. Corresponding embodiments are also applicable for other aspects of the present invention that will be briefly described below.

According to a second aspect of the present invention, there is provided a method of operating a call controlling session initiation protocol type application server in a packet switched part of a telecommunications network system. This call controlling session initiation protocol type application server is handling a call that is performed in the telecommunications network system between two or more terminal units of which at least one terminal unit is served through a circuit switched part of the telecommunications network system. The method of the second aspect of the invention comprises a step of the call controlling session initiation protocol type application server receiving a call termination message from at least one media gateway control function type network node in the circuit switched part of the telecommunications network system. This call termination message comprises call detail data. According to the method the call controlling session initiation protocol type application server generates a charging record for enabling charging for said call.

According to a third aspect of the present invention there is provided a method of operating an extended services session initiation protocol type application server for enabling call charging in a telecommunications network system. This method according to the third aspect comprises a step of the extended services session initiation protocol type application server receiving through the telecommunications network system an indication of a call that is performed in the telecommunications system between two or more terminal units of which at least one terminal unit is served through a circuit switched part of said telecommunications network system. The method further comprises a step of the extended services session initiation protocol type application server providing an instruction to a media gateway control function type network node serving the at least one terminal unit in said circuit switched part, to include call detail data from the circuit switched part in a call termination message to be sent by the media gateway control function type network node to a call controlling session initiation protocol type application server in the packet switched part of the telecommunications network system.

According to a fourth aspect of the present invention there is provided a network node for circuit switched parts of a telecommunications network system, wherein said network node comprises a media gateway control function. The network node comprises a receiver unit for receiving an indication that a call which has been established involving said network node is being terminated. The receiver unit is also suitable for receiving call detail data for said call from a switching network node in said circuit switched part of the telecommunications network system. The network node further comprises a transmitter unit for transmitting a call termination message to a call controlling session initiation protocol type application server in a packet switched part of the telecommunications network system. The network node further comprises a message editor for including said received call detail data in the terminating message, such as to enable making said call detail data available in the packet switched part of the telecommunications network system for enabling call charging in the packet switched part of the telecommunications network system.

According to a fifth aspect of the present invention there is provided a call controlling session initiation protocol type application server for a packet switched part of a telecommunications network system. The call controlling session initiation protocol type application server comprises a processing unit for handling a call in the telecommunications network system between two or more terminal units of which at least one terminal unit is served through a circuit switched part of the telecommunications network system. The call controlling session initiation protocol type application server comprises a receiver unit for receiving a call termination message from at least one media gateway control function type network node in a circuit switched part of the telecommunications network system. The processing system of the call controlling session initiation protocol type application server is arranged for extracting call detail data of said circuit switched part of the telecommunications network system from said termination message. The call controlling session initiation protocol type server further comprises a message generator for generating a call charging record for enabling charging for said call, said call charging record containing both call detail data of said packet switched part of the telecommunications network system and call detail data of said circuit switched part of the telecommunications network system.

According to a sixth aspect of the present invention there is provided an extended services session initiation protocol type application server for telecommunications network system. The extended services session initiation protocol type application server comprises a receiver unit for receiving through the telecommunications network system an indication of a call that is performed in the telecommunication system between two or more terminal units of which at least one terminal unit is served through a circuit switched part of said telecommunications network system. The extended services session initiation protocol type application server according to this sixth aspect further comprises a processing unit for providing an instruction to a media gateway control function type network node serving the at least one terminal unit in the circuit switched part of said telecommunications network system. This instruction instructs the media gateway control function type network node to include call detail data from the circuit switched part of said telecommunications network system in the call termination message which is to be sent by the media gateway control function type network node to a call controlling session initiation protocol type application server in the packet switched part.

With respect to the above mentioned brief description of the invention, it is noted that the specific unit mentioned therein may be implemented in any of the network nodes or application servers or any other network entities as either software or hardware implementations. Similarly, the skilled person may appreciate that also the specific method steps described in the methods of the present invention may be performed by any dedicated hardware or software function in the network entities involved.

BRIEF DESCRIPTION OF THE DRAWINGS

FIG. 5 schematically illustrates a method of the present invention for operating a SIP-AS;

FIG. 6 illustrates a method of the present invention for operating an extended services SIP-AS;

DETAILED DESCRIPTION

Throughout the description, a distinction is made between an extended services session initiation protocol type application server (extended services SIP-AS) and a call controlling session initiation protocol type application server (call controlling SIP-AS). This distinguishment is made in order to make clear to the skilled reader that the call controlling SIP-AS which receives the call detail records (CDR's) in the invention is not necessarily the same entity as the extended services SIP-AS that will enable the functionality of the media gateway control function (MGCF) to send the CDR to the packet switched (PS) network. The functionality provided by the present invention is added functionality that may be provided using the extended services SIP-AS. The skilled person will appreciate that the functional entities call controlling SIP-AS and extended services SIP-AS can be implemented as stand-alone dedicated network entities, or within a network node together with other functional entities; and the call controlling SIP-AS and extended services SIP-AS may even be co-located in one and the same network node. This applies to the embodiments described throughout this description where these functional entities play a role.

Figure 1:
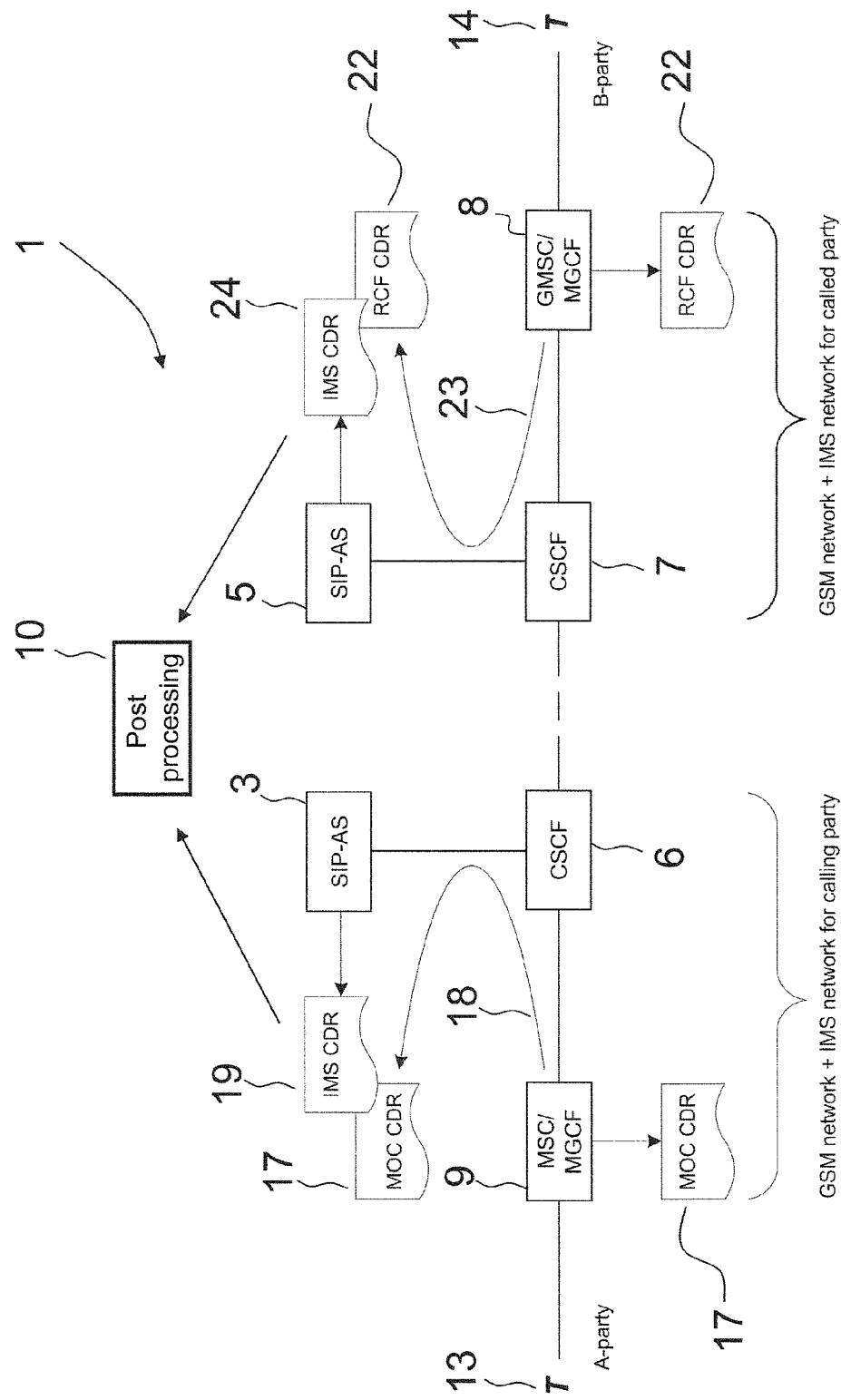
FIG. 1 illustrates the principles of the present invention, applied in a telecommunications network system.

In FIG. 1 the method of the present invention is schematically illustrated for a telecommunications network system 1. In telecommunications network system 1 terminal 13 and switching node 9 reside in a circuit switched part of the telecommunications network system. Also, terminal 14 and switching node 8 reside in a further circuit switched part of the telecommunications network system 1 of FIG. 1. In the packet switched part, which may be an IP multimedia subsystem (IMS) type network, the entities of the telecommunications network system 1 shown in FIG. 1 are call session control functions (CSCF) 6 and 7 and call controlling SIP application servers (SIP-AS) 3 and 5. In this respect it is noted that the actual call handling is performed by CSCFs 6 and 7 in the IMS network, under control or supervision by SIP-AS 3 and 5. Also shown is a post processing system 10, which performs the post processing of charging information from the charging records received, for charging the services to the users.

Figure 9:
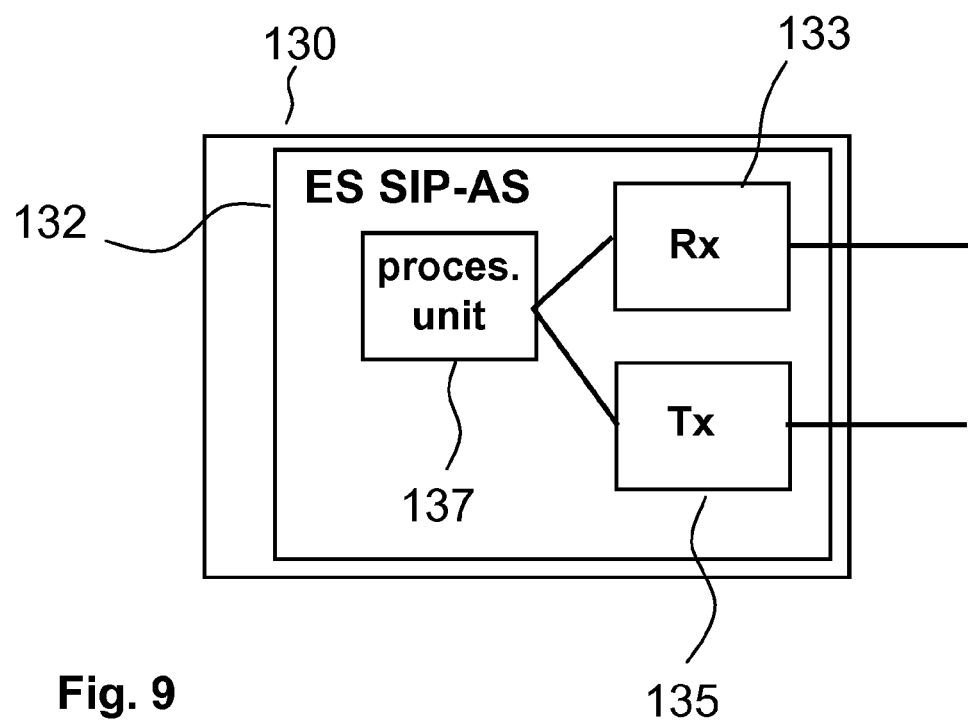
FIG. 9 illustrates a network entity containing an extended services SIP-AS server according to the present invention.

The basic principles of call set up are deemed to be known to the skilled person. A brief summary is given below for call setup between calling party 13 and called party 14, wherein calling party 13 makes use of extended services managed by an extended services SIP application server (ES SIP-AS, not shown in FIG. 1). A schematic example of an extended services session initiation protocol type application server (ES SIP-AS) is illustrated in FIG. 9, and will be discussed later on in this description.

Calling party (A-party) 13 establishes a call from GSM network and this subscriber's call is anchored in IMS through an extended services SIP-AS (not shown in FIG. 1). The architecture principles of IMS anchoring are assumed to be well understood. The calling party 13 (A-party) is an IMS subscriber served from the packet switched IMS network and (amongst others) through the circuit switched GSM network. Call handling including service invocation is done from a CSCF, such as CSCF 6. Charging may be done through charging records generated by a call controlling or call managing SIP-AS 3; which may be an IP Centrex or another suitable application server.

The called party 14 (B-party) is also an IMS subscriber. Calls destined for this subscriber are also anchored in IMS, if the call is established in CS domain. The call for this subscriber 14 may be offered to that person's SIP phone, to that person's GSM phone or both. The call can be accepted on one device at the most. FIG. 1 shows a scenario where the call is accepted on the called party's GSM terminal 14, reachable through gateway MSC (GMSC) 8. The principle of the invention applies to both originating call handling and terminating call handling.

Charging of the costs of making the call is done on the basis of charging information generated in the various network parts. For circuit switched networks, the charging information can be found in call detail records (CDR's) generated by the MSC or GMSC. For the packet switched part of the telecommunications network (the IMS network), charging records are generated by the SIP application servers 3 and 5 at the end of the call, during the call or both. Eventually, all charging information is combined during a post processing operation in a post processing server 10. As will be understood, the various network entities and network functions in both the circuit switched part of the network and the packet switched part of the network may be implemented as separate dedicated entities (such as a separate MSC and a separate media gateway control function (MGCF)), or may be combined in one or more network nodes. Also, the post processing server 10 may be a separate network entity or may be integrated in any of the SIP application servers 3 and/or 5 shown in FIG. 1.

For an originating call in the circuit switched part of the network, the MSC generates at the end of the call a mobile originating call CDR (MOC CDR) comprising all the relevant charging information for this call. For a terminating call in a mobile network, the visited MSC (VMSC) generates a mobile terminating call CDR (MTC CDR), and the GMSC generates a roaming call forwarding CDR (RCF CDR). The GMSC and the VMSC may be located in one and the same node. In the IMS network, charging records are generated by the SIP-AS, such as SIP-AS 3 or SIP-AS 5 or both. With respect to the CDR's mentioned above, it may be understood that these CDR's may be separate CDR's, or may be combined in a 'composite' CDR containing besides the MOC CDR also one or more of a transit CDR, an intelligent networking (IN) incoming CDR and an intelligent network (IN) outgoing CDR. In general, the term composite CDR is to be interpreted as a call detail record that includes several types of call detail records, or the information of such several types of records. In addition to the above, other entities in the IMS network or packet switched part of the network may also generate charging records, although for the moment and for clarity of this description, this is not further discussed here.

The charging information according to the present invention, is exchanged through the network at the end of the call. Referring back to FIG. 1, at some point switching network node 9 receives an indication that the ongoing call is being terminated. This may either be a call termination message ('Release') from the calling terminal 13, or a call termination message ('Bye') received from the packet switched part of the telecommunication network, in the case that the called party 14 takes the initiative to terminate the call. In the case that the calling terminal terminates the call, the call termination message is to be forwarded to the packet switched IMS network. If the called terminal 14 has terminated the call, switching node 9 will acknowledge this upon receipt of the call termination message to the packet switched part of the telecommunications network system.

According to the present invention the media gateway control function (MGCF) 9 (which is integrated with the MSC in the present example), will include the MOC CDR 17 in the SIP message to be sent to the packet switched network. This may simply be performed by including the contents of the MOC CDR 17 as a text component in the body of the SIP message. Upon forwarding of this SIP message to the SIP application server (SIP-AS) 3 as schematically indicated in FIG. 1 with arrow 18, the SIP application server 3 then receives the MOC CDR 17. SIP application server 3 generates a charging record including the call details from the packet switched part of the network (the IMS CDR 19), and also includes the contents of the MOC CDR 17 into the charging record. This charging record is forwarded to post processing system 10 for charging purposes.

For the called terminal 14, the method of forwarding the call detail information through the network for charging purposes is more or less the same. In this case, however, upon receipt of the call termination message by GMSC 8, the roaming call forwarding CDR (RCF CDR) 22 is created and provided to the media gateway control function for inclusion in the SIP message to be sent to the packet switched part of the network. The MGCF will include the contents of the RCF CDR 22 in the SIP message (e.g. as a text component in the body of the SIP message), and forward it through the packet switched part of the telecommunications network system to the SIP application server 5. This is schematically illustrated by arrow 23 in FIG. 1. The SIP application server 5 generates a charging record wherein the charging information from the packet switched part of the network (the IMS CDR 24) is included. The SIP application server 5 also includes the information from the RCF CDR 22 received through the SIP message from the MGCF 8. This charging record is then forwarded by SIP application server 5 to the post processing system 10.

In the above, it will be understood that SIP application server 5 for the called party and SIP application server 3 for the calling party may be one and the same entity in the case that both parties are served by the same SIP-application server. In the post processing system 10, the charging of the call is performed based on the charging records received from the SIP application server 3 and 5. Now, since the charging records of the SIP application servers 3 and 5 also contain the information from the circuit switched part of the network, there is no need to perform a cumbersome and complex correlation process for correlating the information from the circuit switched part of the network with the call details from the packet switched part of the network.

Figure 2:
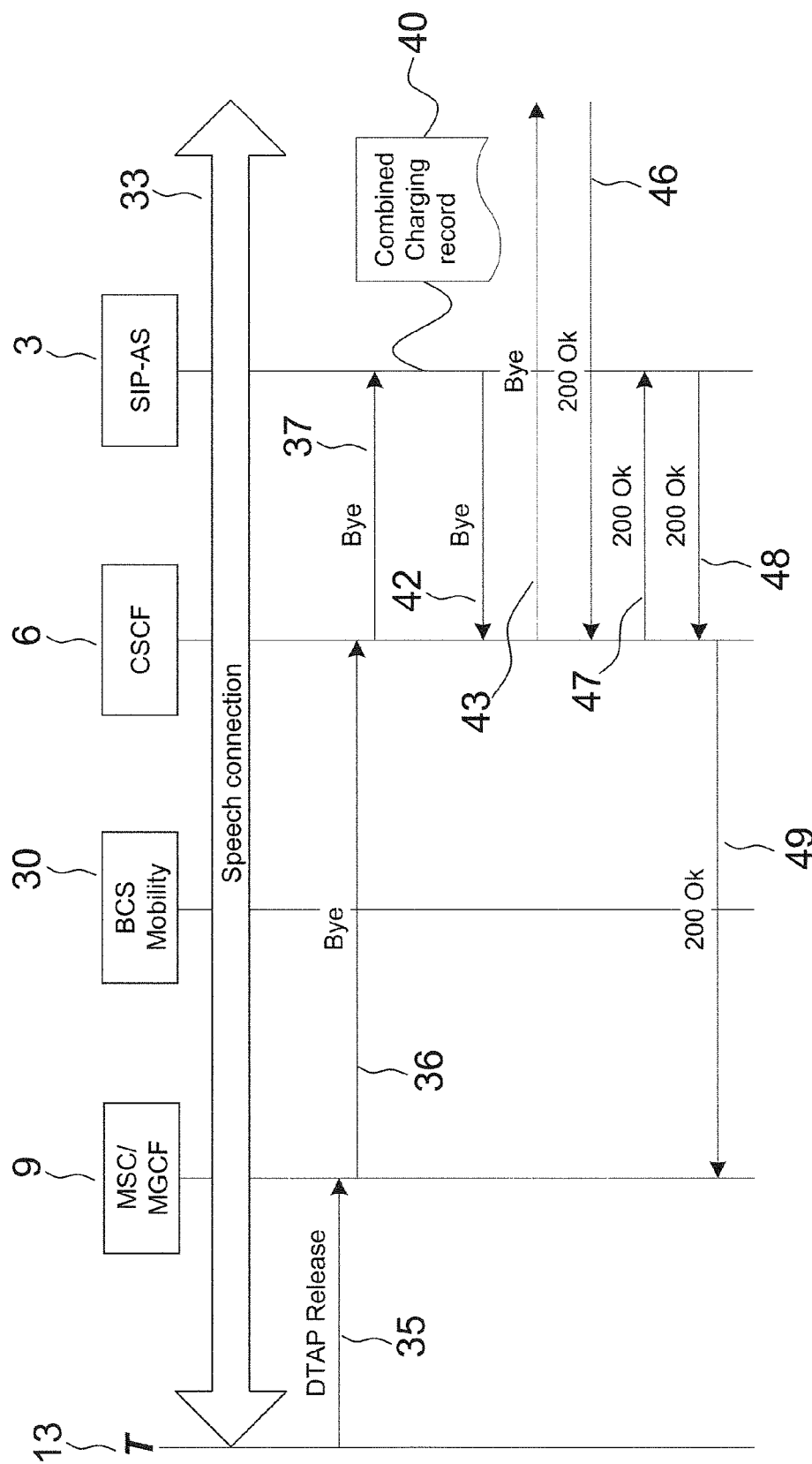
FIG. 2 shows a sequence diagram of a call termination process by the called party in the telecommunications network system of FIG. 1.

For clarity purposes in FIG. 2 the method of the present invention, in particular the signalling, is schematically illustrated by a sequence diagram for the case wherein the calling party 13 terminates the ongoing call. In FIG. 2, the ongoing call is illustrated by speech connection 33 as a double arrow. At a certain moment in time, calling terminal 13 terminates the call, and a direct transfer application part (DTAP) release message 35 is sent to the mobile switching centre/media gateway control function 9 (MSC/MGCF). The MGCF creates a call termination SIP message 36 ('BYE') and includes therein the Call Detail Record received from the MSC as a text component. The MGCF forwards this message to the CSCF 6 in the packet switched network. The CSCF 6 forwards this message in step 37 to the SIP application server 3. The SIP application server 3 now generates a combined charging record 40 comprising the charging information from the IMS network and the charging information from the circuit switched part of the network as contained in the CDR received with the 'BYE' SIP message. The call termination SIP message 'BYE' is then in step 42 forwarded via the CSCF 6 to the SIP application server of the called terminal (in FIG. 2 this SIP-AS 5 is not shown).

In step 46, call termination is acknowledged by the SIP-AS 5 (not shown) to the SIP-AS 3 by sending a '200 OK' SIP message. This message is forwarded by the CSCF 6 to the SIP-AS 3 in step 47. The SIP-AS, upon receipt of the '200 OK' message, forwards this message to the MGCF in steps 48 and 49, and the call is terminated.

Figure 3:
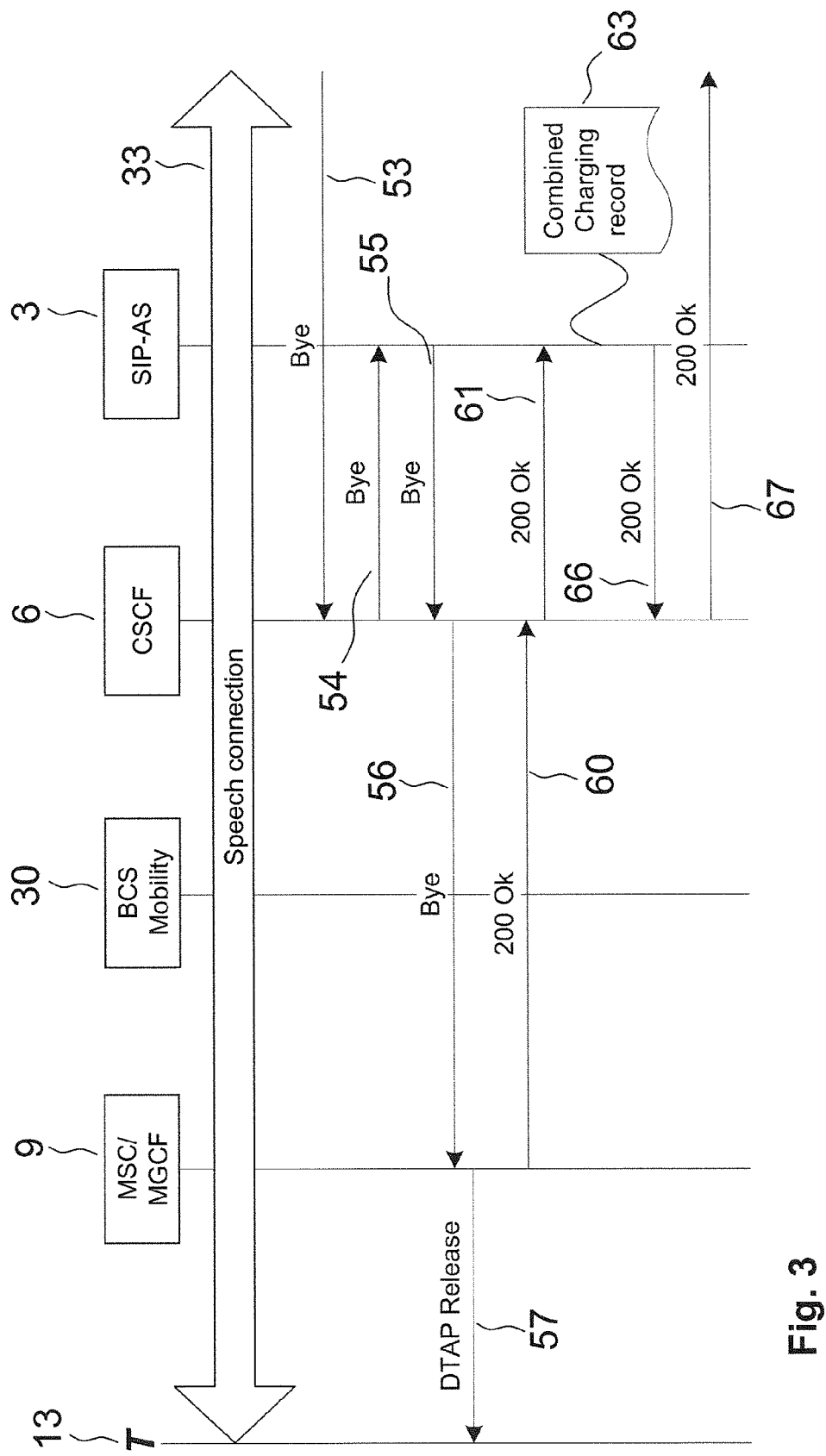
FIG. 3 shows a sequence diagram of a call termination process by the called party in the telecommunications network system of FIG. 1.

Call termination for the case wherein the called terminal 14 (not shown in FIG. 3) terminates the call is shown in FIG. 3. In FIG. 3, the ongoing speech connection is schematically illustrated by double arrow 33. At some point, the SIP application server 3 in steps 53 and 54 receives the call termination SIP message 'BYE'. This call termination SIP message is forwarded in steps 55 and 56 to the media gateway control function 9 serving the calling terminal 13. The MSC 9 generates a direct transfer application part (DTAP) release message and forwards it in step 57 to the calling terminal 13 for releasing the call. The MGCF 9 then generates a '200 OK' SIP message including the call detail record from the MSC for this call, and forwards it in steps 60 and 61 to the SIP-AS 3. The SIP-AS 3 generates a combined charging record 63, and forwards the '200 OK' SIP message in steps 66 and 67 to the network entities serving the called party 14 (not shown).

Figure 4:
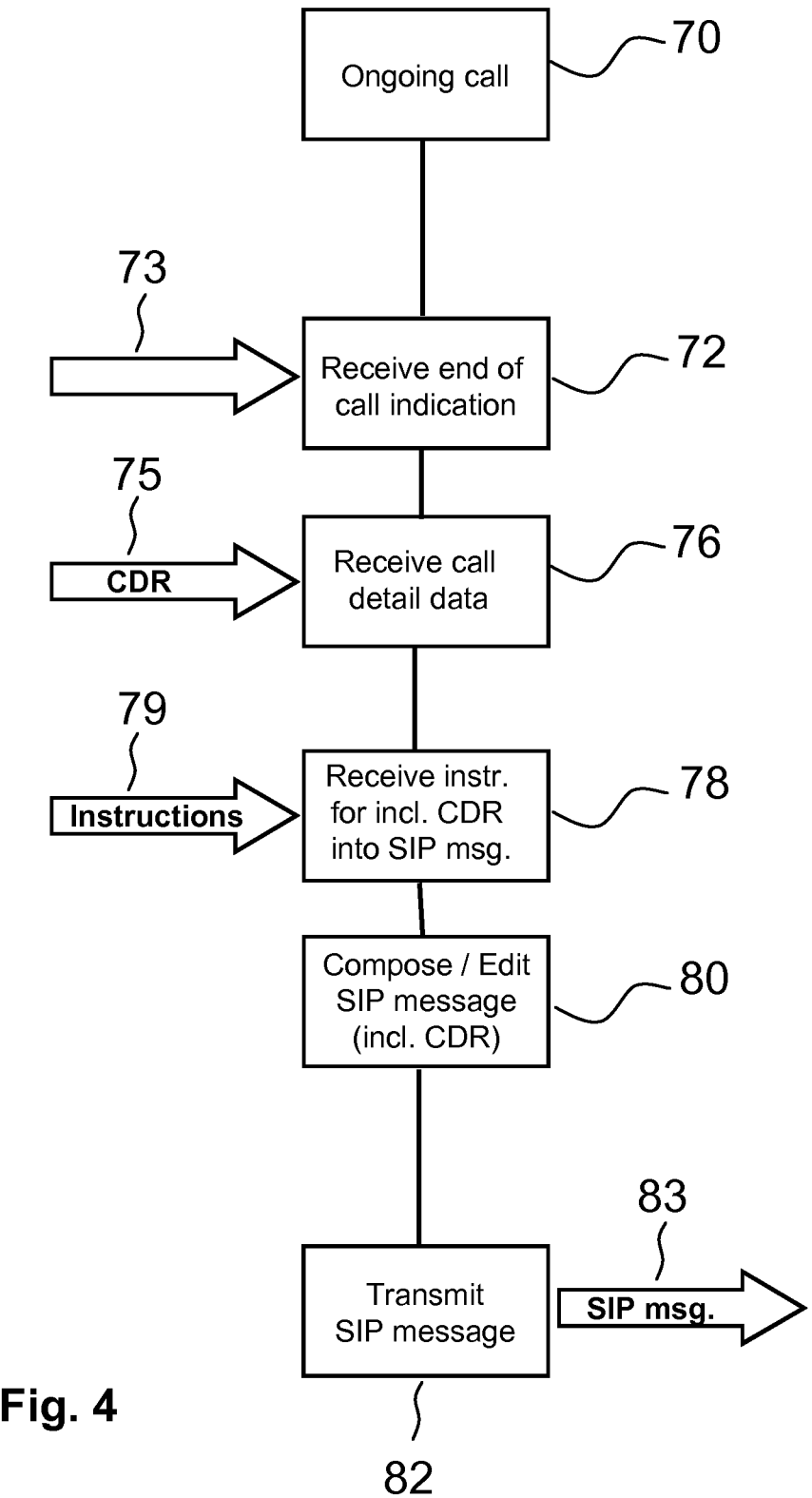
FIG. 4 schematically illustrates the method of the present invention.

FIG. 4 illustrates a method of operating a media gateway control function (MGCF), as network node in the circuit switched part of the network, in accordance with the present invention. The method in FIG. 4 starts with an ongoing call 70. At some point in step 72 the MGCF receives an indication that the ongoing call is being terminated by any of the parties. This is illustrated in step 72 and the incoming indication is schematically illustrated by arrow 73. The MGCF then receives the call detail data in step 76 as a CDR 75 from, for example, the MSC.

Optionally, in step 78 the MGCF may receive instructions (i.e. a single instruction or a set of instructions) for including the CDR into the SIP message to be sent to the IMS network. It may, alternatively, be preprogrammed into the MGCF to always include the information from the CDR into the SIP message to the SIP-AS, i.e. the MGCF performing this function on its own initiative. Also, it will be understood that the instruction 79 in step 78 may be received at any time during the call or at the beginning of the call, but prior to the sending of the SIP message to the SIP-AS 3 wherein call termination is announced or acknowledged.

In step 80, the SIP message to be sent to the SIP-AS server 3 in the IMS network is composed or edited, and the information from the call detail record (CDR) is included. In step 82, the SIP message is transmitted to the IMS network as illustrated by arrow 83.

Figure 5:
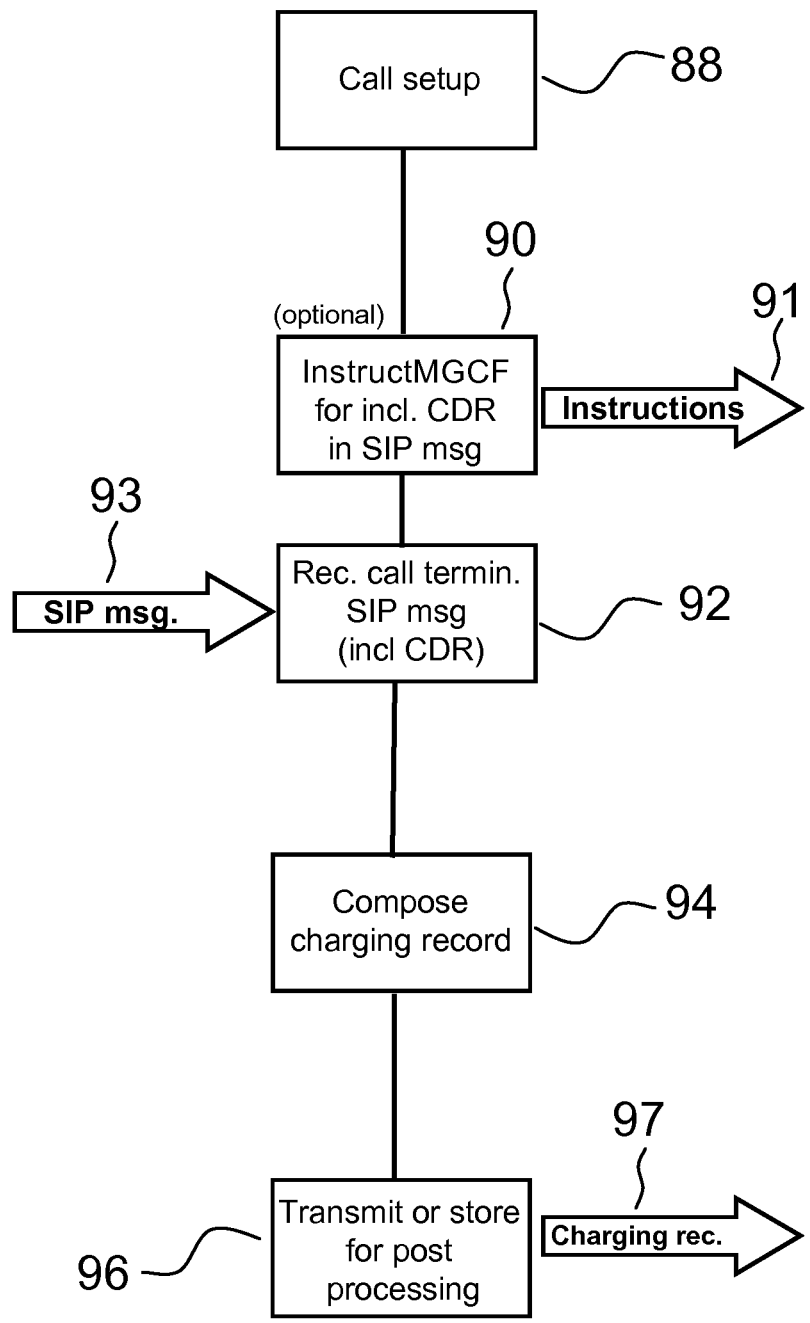

In FIG. 5, method of operating a SIP-AS server according to the present invention is schematically illustrated. The call setup and the ongoing call are schematically illustrated by step 88. At some point during the call, optionally, the SIP-AS server may provide instructions 90 to the MGCF serving either the called party or the calling party that information from the CDR generated by the circuit switched part of the telecommunications network system is to be included in the SIP message at the end of the call. This is schematically illustrated by arrow 91.

In step 92, the SIP-AS server receives the SIP message 93 wherein the end of the call is either announced or acknowledged to the SIP-AS server. This SIP message includes the CDR from the circuit switched part of the network. In step 94, a charging record including all the charging details from both the IMS network and the received charging details from the circuit switched part of the network is composed. This charging record is transmitted in step 96 to a post processing system, as schematically indicated by arrow 97.

Figure 6:
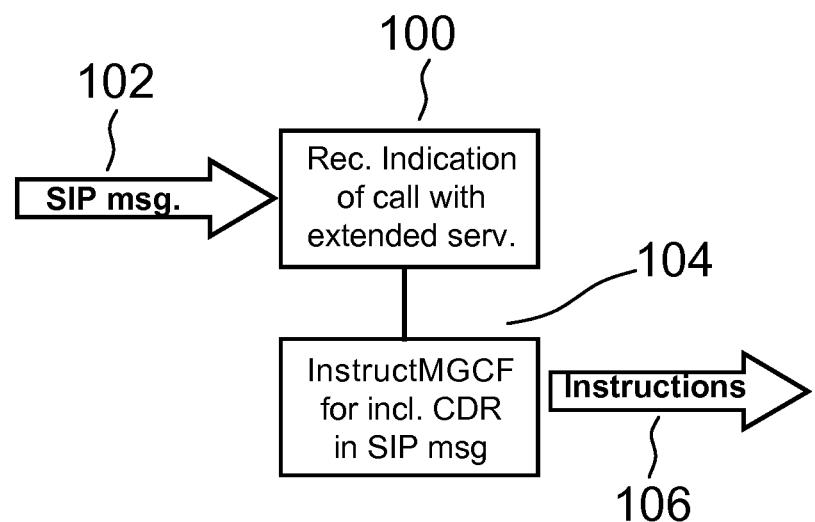

In FIG. 6, the method of operating an extended services SIP-AS is schematically illustrated. At some point, the extended services SIP-AS receives an indication of the setup of a call to which extended services apply (e.g. because the subscriber is known to the extended services SIP-AS or for any other reason). The SIP message indicating this to the extended services SIP-AS is schematically illustrated by arrow 102. In step 104, the extended services SIP-AS provides instructions 106 to the MGCF serving the subscribers to which the extended services apply, to include the information from the CDR received from the circuit switched part of the network into the SIP message to be sent at the end of the call.

Figure 7:
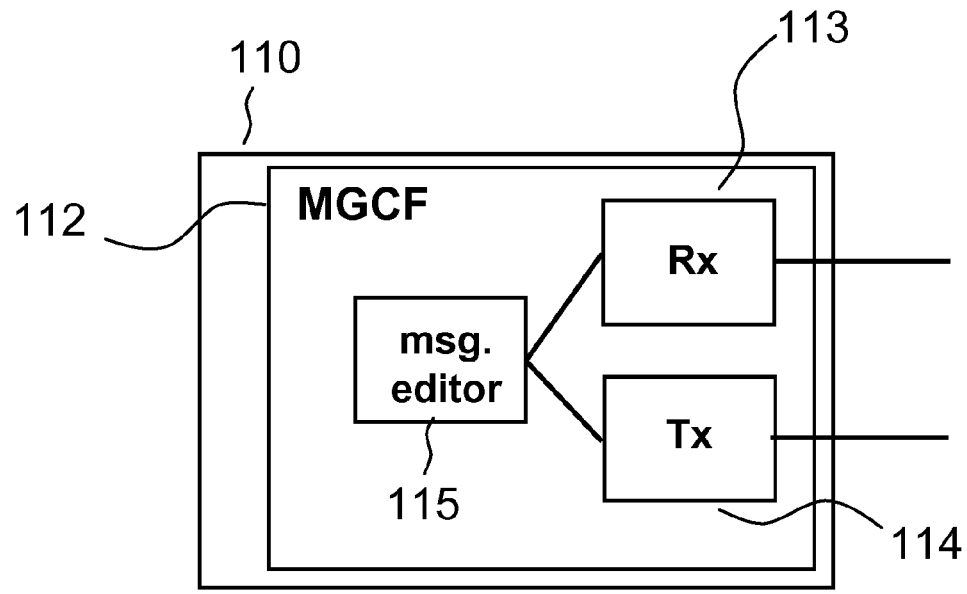
FIG. 7 illustrates a network node according to the present invention.

FIG. 7 illustrates a network node 110 for a circuit switched network, including a media gateway control function 112 suitable for use with the present invention. In the MGCF 112, a receiver unit 113 and a transmitter unit 114 are included for receiving indications from the packet switched and circuit switched network, and for transmitting information to these network parts. Also, the MGCF includes a message editor which allows the inclusion of CDR information into a SIP message which announces or acknowledges the call termination.

Figure 8:
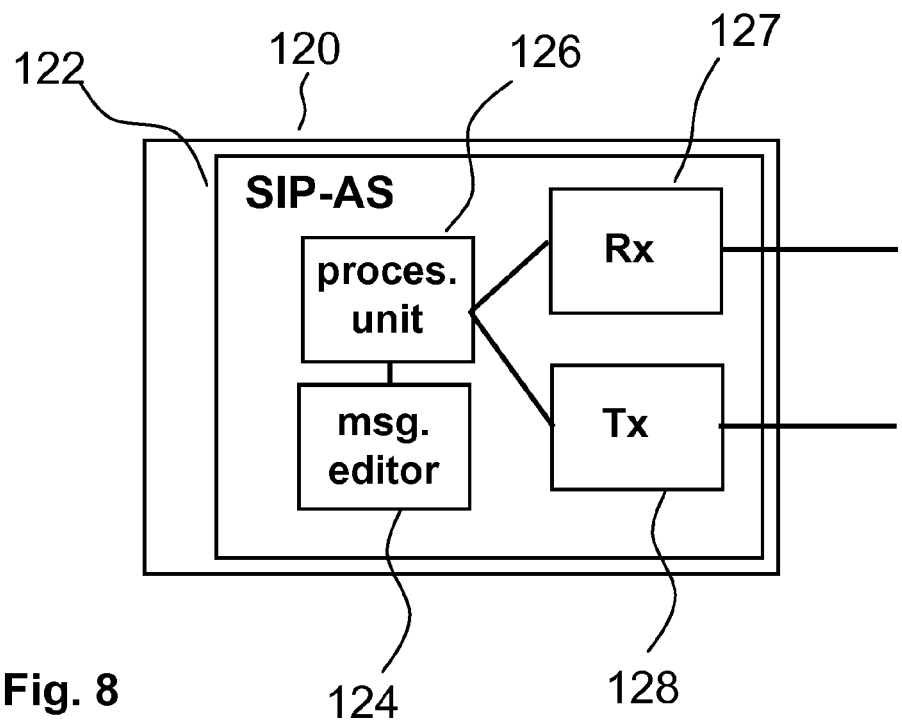
FIG. 8 illustrates a network entity containing a SIP-AS server of the present invention.

In FIG. 8, a network entity 120 for an IMS network is schematically illustrated, which includes a SIP-AS 122. The SIP application server 122 includes a processing unit 126 and a message editor 124. It further includes a receiver unit 127 and a transmitter unit 128 for communicating with the IMS network. The processing unit 126 is arranged for handling or managing a call that is performed in telecommunications network system consisting of the IMS network and the circuit switched GSM networks attached thereto. The processing unit is further arranged for extracting call detail data from the termination SIP message received through the network. The message editor of the SIP-AS 122 is arranged for generating a call charging record for enabling call charging of the call.

In FIG. 9, the network entity 130 for an IMS network is illustrated, containing an extended services SIP-AS server 132. The extended services SIP-AS 132 contains a receiver unit 133 and a transmitter unit 135 for communicating with the IMS network. In addition, the extended services SIP-AS contains a processing unit which enables to process the receipt of an indication that a call is established for a user entitled to extended services, and for enabling the provisioning of an instruction to a media gateway control function for including call detail data from the circuit switched part of the telecommunications network system into a SIP message to be sent to the SIP-AS in the IMS which handles or manages the call.

In the IP Multimedia Subsystem network, the location of the extended services session initiation protocol type application server (ES SIP-AS) may be determined by the skilled person. However, a suitable location for the extended services session initiation protocol type application server (ES SIP-AS) may be between the media gateway control function (MGCF) and the call session control function (CSCF).

In the foregoing, the invention has been described based on specific, non limitative embodiments thereof. Various units and entities described in these specific embodiments may be implemented as hardware unit, or may be implemented as logical units or software units, as the skilled person will appreciate. In addition, the operation principle of the present invention can be implemented in many different ways and can be adapted for many different purposes. Details and specific designed choices can be made by the skilled person without departing for the inventive concept described herein. The scope of the present invention is only limited by the appending claims.

The invention claimed is:

1. A method of operating a network node in a telecommunications network system during a call, wherein said call has been established through a packet switched part and a circuit switched part of said telecommunications network system, and wherein said network node comprises a media gateway control function, the method comprising:
    said network node receiving an indication of said call being terminated;
    said network node transmitting a call termination message to a call controlling session initiation protocol application server in said packet switched part, wherein the call termination message includes an indication that said call is being terminated;
    said network node, prior to said transmitting of said call termination message, receiving call detail record (CDR) data in said circuit switched part, said CDR data comprising all charging information for the circuit switched part of said call, wherein the charging information includes a cost of making said call; and
    said network node, prior to said transmitting of said call termination message, including said received CDR data in said call termination message, for making said CDR data available in said packet switched part for enabling call charging in said packet switched part.

2. The method of claim 1, further comprising:
    prior to including said received CDR data in said call termination message, said network node receiving instructions for including said received CDR data in said call termination message from an extended services session initiation protocol application server in said packet switched part of said telecommunications network system.

3. The method of claim 1, further comprising:
    prior to said step of including said received CDR data in said call termination message, said network node receiving instructions for including said received CDR data in said call termination message from said call controlling session initiation protocol application server in said packet switched part of said telecommunications network system.

4. The method of claim 1, wherein said network node for receiving said CDR data, receives at least one element of a group including a mobile originating call detail record, a mobile terminating call detail record, a roaming call forwarding record and a composite call detail record including at least one further call detail record in addition to said mobile originating call detail record, said mobile terminating call detail record or said roaming call forwarding record.

5. The method of claim 1, wherein said call termination message is a session initiation protocol message, and wherein said CDR data is included as a session initiation protocol body component of said call termination message.

6. The method of claim 1, wherein said telecommunications network system is an internet protocol multimedia subsystem (IMS) network system.

7. A method of operating a call controlling session initiation protocol application server in a packet switched part of a telecommunications network system, said call controlling session initiation protocol application server handling a call that is performed in said telecommunications network system between two or more terminal units of which at least one terminal unit is served through a circuit switched part of said telecommunications network system, said method comprising:
    said call controlling session initiation protocol application server receiving a call termination message from at least one media gateway control function network node in a circuit switched part of said telecommunications network system, wherein said call termination message comprises an indication that said call is being terminated and call detail record (CDR) data comprising all charging information for the circuit switched part of said call, wherein the charging information includes a cost of making said call; and
    said call controlling session initiation protocol application server generating a call charging record for enabling call charging for said call.

8. The method of claim 7, wherein prior to receiving said call termination message, said call controlling session initiation protocol application server provides instructions to said at least one media gateway control function network node for including said CDR data in said call termination message.

9. A method of operating an extended services session initiation protocol application server for enabling call charging in a telecommunications network system, said method comprising:
    said extended services session initiation protocol application server receiving, through said telecommunications network system, an indication of a call that is performed in said telecommunications system between two or more terminal units of which at least one terminal unit is served through a circuit switched part of said telecommunications network system;
    said extended services session initiation protocol application server providing an instruction to a media gateway control function network node serving said at least one terminal unit in said circuit switched part to include call detail record (CDR) data, comprising all charging information for the circuit switched part of said call, wherein the charging information includes a cost of making said call, in a call termination message to be sent by said media gateway control function network node to a call controlling session initiation protocol application server in said packet switched part, wherein the call termination message further includes an indication that said call is being terminated.

10. A network node for a circuit switched part of a telecommunications network system, wherein said network node comprises a media gateway control function, said network node comprising:

a receiver circuit for receiving an indication that an established call involving said network node is being terminated, and for receiving call detail record (CDR) data comprising all charging information for the circuit switched part of said call from a switching network node in said circuit switched part, wherein the charging information includes a cost of making said call;

a transmitter circuit for transmitting a call termination message to a call controlling session initiation protocol application server in a packet switched part of said telecommunications network system, wherein the call termination message includes an indication that said call is being terminated; and a message editor for including said received CDR data in said call termination message, such as to enable making said CDR data available in said packet switched part for enabling call charging in said packet switched part.

11. The network node of claim 10, wherein said telecommunications network system is an internet protocol multimedia subsystem (IMS) network system.

12. A call controlling session initiation protocol application server for a packet switched part of a telecommunications network system, said call controlling session initiation protocol application server comprising:

a processing circuit configured to handle a call that is performed in said telecommunications network system between two or more terminal units of which at least one terminal unit is served through a circuit switched part of said telecommunications network system; and a receiver circuit configured to receive a call termination message from at least one media gateway control function network node in a circuit switched part of said telecommunications network system, wherein the call termination message includes an indication that said call is being terminated;

wherein said processing circuit is arranged for extracting call detail record (CDR) data comprising all charging information for the circuit switched part of said call from said call termination message, wherein the charging information includes a cost of making said call; and wherein said call controlling session initiation protocol application server further comprises a message generator for generating a call charging record for enabling charging for said call.

13. The call controlling session initiation protocol application server of claim 12, wherein said telecommunications network system is an internet protocol multimedia subsystem (IMS) network system.

14. An extended services session initiation protocol application server for a telecommunications network system, said extended services session initiation protocol application server comprising:

a receiver circuit configured to receive, through said telecommunications network system, an indication of a call that is performed in said telecommunications system between two or more terminal units of which at least one terminal unit is served through a circuit switched part of said telecommunications network system;

a processing circuit for providing an instruction to a media gateway control function network node serving said at least one terminal unit in said circuit switched part to include call detail record (CDR) data, comprising all charging information for the circuit switched part of said call received from said circuit switched part, in a call termination message to be sent by said media gateway control function network node to a call controlling session initiation protocol application server in a packet switched part of said telecommunications network, wherein the call termination message further includes an indication that said call is being terminated, and wherein the charging information includes a cost of making said call.

15. The extended services session initiation protocol application server according to claim 14, wherein said extended services session initiation protocol application server forms an integral part of a call controlling session initiation protocol application server for a packet switched part of a telecommunications network system, said call controlling session initiation protocol application server comprising:

a processing circuit configured to handle a call that is performed in said telecommunications network system between two or more terminal units of which at least one terminal unit is served through a circuit switched part of said telecommunications network system; and a receiver circuit configured to receive a call termination message from at least one media gateway control function network node in a circuit switched part of said telecommunications network system;

wherein said processing circuit is arranged for extracting call detail record (CDR) data comprising all charging information for the circuit switched part of said call from said call termination message, wherein the charging information includes a cost of making said call; and wherein said call controlling session initiation protocol application server further comprises a message generator for generating a call charging record for enabling charging for said call.

16. The method of claim 1, wherein the call termination message is a bye message.

17. The method of claim 1, wherein the call termination message is a release message.

18. The method of claim 1, wherein the CDR data is received in a mobile originating call (MOC) CDR or a mobile terminating call (MTR) CDR.

19. The method of claim 18, wherein the received MOC CDR or MTR CDR is the only CDR received for said call.

* * * * *